US007665743B2

United States Patent
Poncher et al.

(10) Patent No.: US 7,665,743 B2
(45) Date of Patent: Feb. 23, 2010

(54) ADJUSTABLE STRUT SPACER

(75) Inventors: Scott E. Poncher, Costa Mesta, CA (US); Cordell E. Bauer, Costa Mesa, CA (US); Steven A. Dringenberg, Costa Mesa, CA (US)

(73) Assignee: Readylift Suspension, Inc., Santa Ana, CA (US)

( * ) Notice: Subject to any disclaimer, the term of this patent is extended or adjusted under 35 U.S.C. 154(b) by 0 days.

(21) Appl. No.: 12/135,696

(22) Filed: Jun. 9, 2008

(65) Prior Publication Data

US 2008/0303235 A1 Dec. 11, 2008

Related U.S. Application Data

(60) Provisional application No. 60/933,953, filed on Jun. 8, 2007.

(51) Int. Cl.
*B60G 15/00* (2006.01)
(52) U.S. Cl. ............................ 280/6.157; 280/124.147; 280/124.155; 280/124.1; 280/86.75; 267/179

(58) Field of Classification Search ............... 280/6.15, 280/6.157, 124.145–124.147, 124.154, 124.155, 280/124.179, 124.1, 86.75, 86.771–86.755; 267/3, 4, 175–177, 179, 220; 248/188.2, 248/188.5; 188/321.11
See application file for complete search history.

(56) References Cited

U.S. PATENT DOCUMENTS 3,586,306 A * 6/1971 Reece et al. .................... 267/3
4,458,605 A * 7/1984 Herring et al. .......... 105/197.05

* cited by examiner

*Primary Examiner*—Ruth Ilan
(74) *Attorney, Agent, or Firm*—Paul J. Backofen, Esq.; Crockett & Crockett

(57) ABSTRACT

An adjustable strut spacer includes two complementary strut spacer disks that engage each other and the vehicle suspension to provide adjustable spacing. Each strut spacer disk is flat on one side and stepped on the other side. The steps of the upper strut spacer engage the steps of the lower strut spacer such that when the strut spacer disks are counter rotated the thickness of the adjustable strut spacer changes.

1 Claim, 1 Drawing Sheet

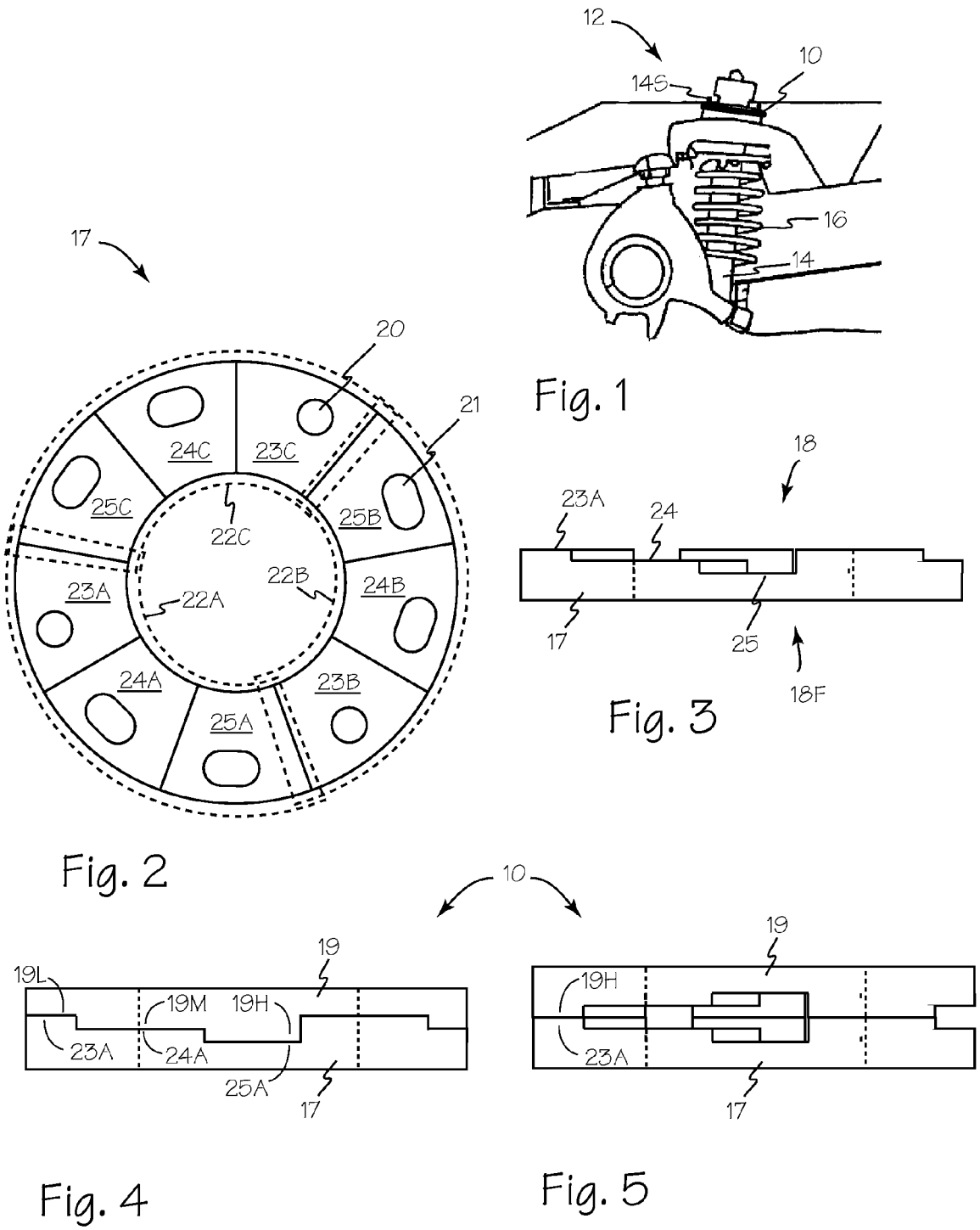

ADJUSTABLE STRUT SPACER

RELATED APPLICATIONS

This application claims priority from U.S. Provisional patent application 60/933,953, filed Jun. 8, 2007.

FIELD OF THE INVENTIONS

The inventions described below relate to the field of automobile accessories and more specifically to the field of aftermarket automobile suspension parts to provide vehicle lift.

BACKGROUND OF THE INVENTIONS

When a vehicle owner seeks to increase the size of the tire and wheel on his or her vehicle one of the considerations is the size of the wheel wells in the vehicle and specifically the space in the front wheel wells as the front tires pivot to turn the vehicle. To increase the available space in a wheel well a typical solution is to lift the vehicle relative to the pavement with the wheel spindle farther from the top of the wheel well. This solution often results in changed suspension and or steering geometry that may have significant negative effects on the handling, performance and safety of the vehicle. These solutions may be complicated and difficult to install and align.

SUMMARY

An adjustable strut spacer is formed by two spacer disks having complementary stepped faces that engage to form a spacer having selectable thickness. Two or more connector holes may be provided through the spacer disks to engage existing vehicle strut studs or other suitable fasteners for maintaining the spacer disks in a reselected alignment. The adjustable strut spacer is installed between the strut and the strut tower to increase lift, or the height of the vehicle body from the pavement. Any suitable material may be used to form the strut spacer disks.

An adjustable strut spacer includes two complementary strut spacer disks that engage each other and the vehicle suspension to provide adjustable spacing. Each strut spacer disk is flat on one side and stepped on the other side. The steps of the upper strut spacer engage the steps of the lower strut spacer such that when the strut spacer disks are counter rotated the thickness of the adjustable strut spacer changes.

The thickness change of the strut spacer may be accomplished using steps, ramps, slots, posts, keyways or any other suitable technique.

The strut spacer disks may be made of any suitable material or combination of materials. The upper and lower strut spacer disks may also be made of different materials or combinations of materials. Each strut spacer disk may be made from steel, aluminum, plastic, glass fiber, reinforced urethane, Delrin® (DuPont) or UHMW plastic or other material that is solid and resists heat and deformation under likely vehicle loads. The strut spacer disks may be cast, machined, forged, injection molded or produced using any suitable process.

BRIEF DESCRIPTION OF THE DRAWINGS

FIG. 1 is a side view of a suspension system with an adjustable strut spacer.
FIG. 2 is a top view of a strut spacer disk.
FIG. 3 is a side view of the strut spacer disk of FIG. 2.
FIG. 4 is a side view of an adjustable strut spacer with two fully engaged strut spacer disks.
FIG. 5 is a side view of an adjustable strut spacer with two strut spacer disks at maximum extension.

DETAILED DESCRIPTION OF THE INVENTIONS

Suspension system 12 of FIG. 1 illustrates the general relationship and installation of adjustable strut spacer 10 relative to shock absorber or strut 14 and coil spring 16. The adjustable strut spacer may be fitted over existing vehicle strut studs 14S, and the combination of the vehicle weight and the strut studs will retain the strut spacer in place and in the desired configuration.

Adjustable strut spacer 10 includes two complementary strut spacer disks such as first strut spacer disk 17 and second strut spacer disk 19. First strut spacer disk 17 is illustrated in FIG. 2 viewed from the stepped side 18. Strut spacer disks are used in complementary pairs, an upper and lower strut spacer disk which are stepped to enable mating different steps results in different thickness for the adjustable strut spacer. Two or more mounting holes and or slots such as hole 20 and slot 21 are provided in each strut spacer disk to maintain the relative orientation of the upper and lower strut spacer disks and to secure the adjustable strut spacer to the suspension system. As illustrated in FIG. 2, high steps such as steps 23A, 23B and 23C may include a hole to minimize relative movement between the first and second strut spacer disks when in the maximum thickness orientation as shown in FIG. 5.

Each strut spacer disk has a flat side such as side 18F and a stepped side such as side 18 as illustrated in FIG. 3. Each step side includes two or more sets of steps such as step sets 22A, 22B and 22C. Each step set includes two or more steps such as steps 23A, 24A and 25A. First and second strut spacer disks 17 and 19 have three sets of three steps, other suitable combinations may also be used to achieve robust, incremental vehicle lift.

The steps of each opposing strut spacer disk such as disks 17 and 19 are complementary to enable opposing strut spacer disks to engage as shown in FIG. 4 for a minimal thickness 26, and as shown in FIG. 5 for maximum thickness 28. In minimal thickness configuration 26 the high steps such as steps 23A, 23B and 23C of first strut spacer disk 17 engage the low steps such as step 19L of second strut spacer disk 19. The medium steps such as steps 24A, 24B and 24C of first strut spacer disk 17 engage the mid steps such as step 19M of second strut spacer disk 19. The low steps such as steps 25A, 25B and 25C of first strut spacer disk 17 engage the high steps such as step 19H of second strut spacer disk 19.

In maximum thickness configuration 28 only the high steps of the first strut spacer disk engage the corresponding high steps of the second strut spacer disk. Intermediate thickness may be achieved by engaging two or more steps of a first strut spacer disk with two or more steps of a second strut spacer disk.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:
1. An adjustable strut spacer comprising:
a first strut spacer disk having a flat side and a stepped side, the stepped side having three sets of steps, each set of steps having a low step, a intermediate step and a high step, the low and intermediate steps having a slot cut through the strut spacer disk from the flat side through the stepped side, the high steps including a circular hole cut through the strut spacer disk from the flat side through the stepped side; and a second strut spacer disk having a flat side and a stepped side, the stepped side having three sets of steps, each set of steps having a low step, a intermediate step and a high step, the low and intermediate steps having a slot cut through the strut spacer disk from the flat side through the stepped side, the high steps including a circular hole cut through the strut spacer disk from the flat side through the stepped side, the stepped side of the first strut spacer disk engaging the stepped side of the second strut spacer disk.

* * * * *